(12) United States Patent
Dong

(10) Patent No.: US 10,139,659 B2
(45) Date of Patent: Nov. 27, 2018

(54) BUFFER STRUCTURE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Dianzheng Dong, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 231 days.

(21) Appl. No.: 14/743,681

(22) Filed: Jun. 18, 2015

(65) Prior Publication Data

US 2016/0170256 A1 Jun. 16, 2016

(30) Foreign Application Priority Data

Dec. 11, 2014 (CN) .......................... 2014 1 0768643

(51) Int. Cl.
*G02F 1/1333* (2006.01)
*F16F 13/08* (2006.01)

(52) U.S. Cl.
CPC ........ *G02F 1/133308* (2013.01); *F16F 13/08* (2013.01); *G02F 2001/133314* (2013.01); *G02F 2201/50* (2013.01); *G02F 2201/503* (2013.01)

(58) Field of Classification Search
CPC ......... G02F 1/133308; G02F 2201/503; G02F 2201/50; G02F 2001/133314;

(Continued)

(56) References Cited

U.S. PATENT DOCUMENTS 3,804,395 A * 4/1974 Muller .................... B60R 19/20
267/140
3,897,856 A * 8/1975 Pineau .................... F16F 13/08
188/268

(Continued)

FOREIGN PATENT DOCUMENTS

CN 101465367 A 6/2009
CN 102788328 A 11/2012

(Continued)

OTHER PUBLICATIONS

First Office Action regarding Chinese application No. 201410768643.0, dated Dec. 22, 2016. Translation provided by Dragon Intellectual Property Law Firm.

*Primary Examiner* — Edward Glick
*Assistant Examiner* — Shan Liu
(74) *Attorney, Agent, or Firm* — Harness, Dickey & Pierce, P.L.C.

(57) ABSTRACT

The present disclosure provides a buffer structure and a display device. The buffer structure includes a deformable sealed capsule, and a flowable filler in a hollow part of the sealed capsule. For the buffer structure according to the present disclosure, the hollow part of the deformable sealed capsule is provided with the flowable filler, when the display device suffers uneven internal forces resulting from deformation of the liquid crystal panel or the backboard, the flowable filler in the hollow part of the buffer structure flows to a position suffering a smaller force from a position suffering a larger force until achieving the force balance, thereby to reduce difference of forces at different positions in the display device and further improve light leakage phenomenon caused by uneven forces.

9 Claims, 1 Drawing Sheet

(58) Field of Classification Search
CPC ... G02F 1/133608; G02F 2001/133311; G02F 2001/133317; G02F 2001/13332; G02F 2001/133322; G02F 2001/133325; G02F 2001/133328; G02F 2001/133331; G02F 2001/133334; F16F 13/08; F16F 13/10
USPC .............................................. 349/58, 59, 60
See application file for complete search history.

(56) References Cited

U.S. PATENT DOCUMENTS

| | | | |
|---|---|---|---|
| 6,934,961 B2 * | 8/2005 | Itakura | F16F 13/10 720/692 |
| 2005/0212991 A1 * | 9/2005 | Sugawara | G02F 1/133308 349/58 |
| 2006/0151355 A1 * | 7/2006 | Oh | A45D 33/008 206/581 |
| 2007/0019275 A1 * | 1/2007 | Okuda | G02F 1/133615 359/265 |
| 2007/0259141 A1 * | 11/2007 | Ohki | F16F 9/30 428/35.2 |
| 2008/0212012 A1 | 9/2008 | Hirai et al. | |
| 2008/0252811 A1 * | 10/2008 | Shang | G02B 6/0088 349/60 |
| 2010/0110326 A1 * | 5/2010 | Isobe | G02F 1/1323 349/58 |
| 2013/0135555 A1 * | 5/2013 | Chen | B29C 70/745 349/60 |
| 2013/0223094 A1 * | 8/2013 | Yang | G02B 6/0085 362/606 |
| 2013/0277900 A1 * | 10/2013 | Asano | F16F 13/08 267/140.13 |
| 2013/0335211 A1 * | 12/2013 | Kobayashi | G06F 1/1626 340/407.2 |
| 2015/0219941 A1 * | 8/2015 | Choi | G02F 1/133308 349/61 |
| 2015/0362783 A1 * | 12/2015 | Lv | G02F 1/13394 349/153 |

FOREIGN PATENT DOCUMENTS

| | | |
|---|---|---|
| CN | 103605220 A | 2/2014 |
| CN | 203851222 U | 9/2014 |

* cited by examiner

BUFFER STRUCTURE AND DISPLAY DEVICE

CROSS-REFERENCE TO RELATED APPLICATION

This application claims a priority to Chinese Patent Application No. 201410768643.0 filed on Dec. 11, 2014, the disclosure of which is incorporated in its entirety by reference herein.

TECHNICAL FIELD

The present disclosure relates to the field of display, in particular to a buffer structure and a display device.

BACKGROUND

A liquid crystal display device mainly includes a liquid crystal panel, a backlight module, a backboard and etc. In order to prevent the liquid crystal panel from being damaged during a vibration process, a gel strip is usually arranged between the liquid crystal panel and the backboard to play a role of buffering. However, in case that the liquid crystal display device suffers uneven internal forces due to factors such as deformation of the backboard or the liquid crystal panel, the existing gel strip cannot provide an improving effect against the uneven forces after the deformation because the existing gel strip is generally a solid silica gel strip and only has a certain buffer function. As a result, visible light leakage phenomenon easily occurs in the liquid crystal display device.

SUMMARY

A technical problem to be solved by the present disclosure is to provide a buffer structure and a display device, which may improve uneven internal forces caused by deformation of a liquid crystal panel or a backboard.

In order to solve the above technical problem, the present disclosure provides a buffer structure, including a deformable sealed capsule and a flowable filler in a hollow part of the sealed capsule.

Further, the filler is at least one of a gas and a liquid.

Further, the gas is an inert gas.

Further, a cross-section of the sealed capsule is a semi-circle or trapezoid shape.

Further, the sealed capsule has a consistent thickness between an internal wall and an external wall at different positions.

Further, the sealed capsule is made of an elastic material.

Further, the elastic material includes silica gel.

In order to solve the above technical problem, the present disclosure further provides a display device, including the above-mentioned buffer structure.

Further, the buffer structure is arranged between a liquid crystal panel and a backboard of the display device.

In order to solve the above technical problem, the present disclosure further provides a display device, including a liquid crystal panel, a backboard and a buffer structure arranged between the backboard and the liquid crystal panel. The buffer structure includes a deformable capsule and a fluid sealed within the capsule.

Further, the display device further includes a rubber frame arranged at the backboard; the capsule is sandwiched between the rubber frame and the liquid crystal panel.

Further, the buffer structure is connected to the rubber frame by a double-sided adhesive tape; the buffer structure is connected to the liquid crystal panel by a double-sided adhesive tape.

Further, a contact area between the buffer structure and the rubber frame is different from a contact area between the buffer structure and the liquid crystal panel.

Further, a contact area between the buffer structure and the rubber frame is larger than a contact area between the buffer structure and the liquid crystal panel.

Further, a contact portion between the buffer structure and the rubber frame is of a different shape from a contact portion between the buffer structure and the liquid crystal panel.

Further, there is a surface contact between the buffer structure and the rubber frame; and there is a line contact between the buffer structure and the liquid crystal panel.

Further, the fluid includes an inert gas.

Further, the capsule includes an internal wall and an external wall; the capsule has a consistent thickness between the internal wall and the external wall at different positions.

Further, the capsule is made of an elastic material.

Further, the capsule is made of silica gel.

For the buffer structure according to the present disclosure, the hollow part of the deformable sealed capsule is provided with the flowable filler, when the display device suffers uneven internal forces resulting from deformation of the liquid crystal panel or the backboard, the flowable filler in the hollow part of the buffer structure flows to a position suffering a smaller force from a position suffering a larger force until achieving a force balance, thereby to reduce difference of forces at different positions in the display device and further improve light leakage phenomenon caused by uneven forces.

DETAILED DESCRIPTION

Implementation of the present disclosure will be further described in details hereinafter in conjunction with the drawings and embodiments. The following embodiments are used for illustrating the present disclosure, but not intended to limit the scope of the present disclosure.

Figure 1:
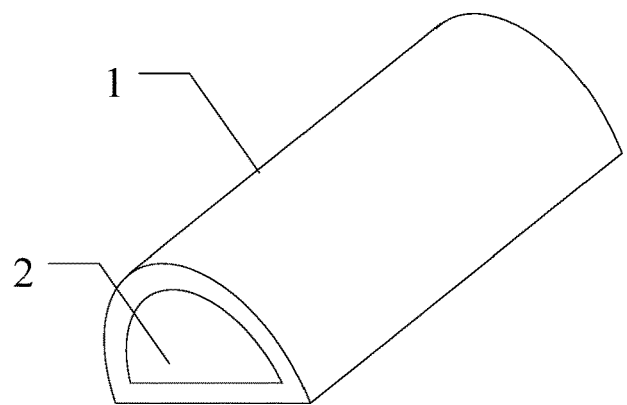
FIG. 1 is a schematic view of a buffer structure according to one embodiment of the present disclosure.

FIG. 1 is a schematic view of a buffer structure according to one embodiment of the present disclosure. The buffer structure includes a deformable sealed capsule 1. A hollow part 2 of the sealed capsule 1 is provided with flowable filler.

Figure 2:
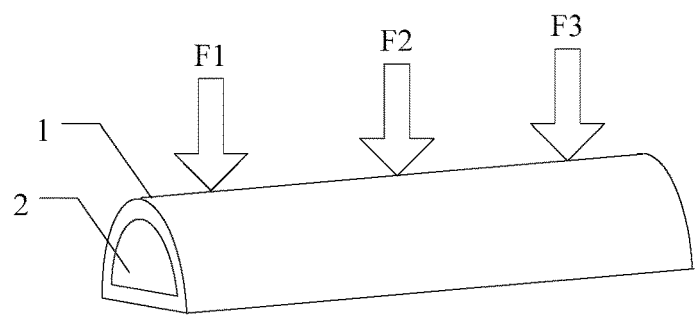
FIG. 2 is a schematic view of the buffer structure when suffering from forces according to one embodiment of the present disclosure.

Specifically, as shown in FIG. 2, when the buffer structure suffers uneven forces, for example, F2>F1=F3, a position at the buffer structure corresponding to F2 is depressed to cause the filler which can flow in the internal of the buffer structure to flow towards positions corresponding to F1 and F3. As a result, the sealed capsule 1 is inflated at the positions corresponding to F1 and F3, and the force applied at the position corresponding to F2 is gradually decentralized towards the positions corresponding to F1 and F3, until achieving a force balance.

For the buffer structure according to one embodiment of the present disclosure, the hollow part of the deformable sealed capsule is provided with the flowable filler. When the display device suffers uneven internal forces resulting from deformation of a liquid crystal panel or a backboard, the flowable filler in the hollow part of the buffer structure flows to a position suffering a smaller force from a position suffering a larger force until achieving a force balance, thereby to reduce difference of forces at different positions in the display device, and further improve light leakage phenomenon caused by uneven forces.

The filler may be gas or liquid. Alternatively, one part of the filler is gas, and the other part of the filler is liquid. For example, in order to improve stability of the buffer structure and prevent the sealed capsule from being corroded by the filler, the gas may be inert gas, such as helium (He) gas, neon (Ne) gas, and argon (Ar) gas.

A cross-section of the sealed capsule 1 may be a semicircle shape as shown in FIG. 1, or other shapes such as a trapezoid shape.

Alternatively, in order to further reduce the difference of forces at different positions when achieving the force balance, the sealed capsule may have a consistent thickness between an internal wall and an external wall at different positions.

Alternatively, the sealed capsule may be made of elastic material, so as to improve sensitivity of the buffer structure when suffering forces. Even in case that the difference of forces applied at different positions is smaller, it may also cause the sealed capsule to deform, so as to drive the internal filler to flow. For example, the sealed capsule may be made of a material, such as a silica gel.

Figure 3:
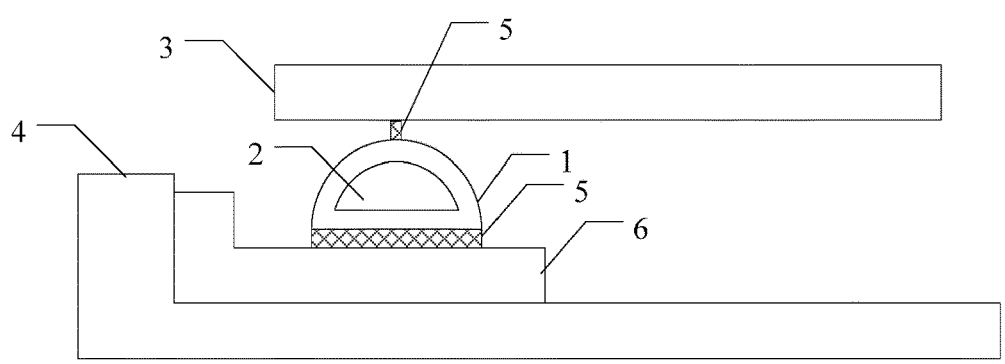
FIG. 3 is a schematic view of a display device according to one embodiment of the present disclosure.

FIG. 3 is a schematic view of a display device according to one embodiment of the present disclosure. Referring to FIG. 3, the display device includes a liquid crystal panel 3, a backboard 4, and the above-mentioned buffer structure between the liquid crystal panel 3 and the backboard 4. Specifically, the backboard 4 is provided with a rubber frame 6, double-sided adhesive tapes 5 are attached at two sides of the buffer structure, respectively, so that the two sides of the buffer structure may be attached to the liquid crystal panel 3 and the rubber frame 6, respectively.

The display device may be any product or component having a display function such as a liquid crystal panel, a mobile phone, a flat computer, a television, a display, a laptop, a digital frame and a navigator.

For the display device according to one embodiment of the present disclosure, the buffer structure is arranged between the liquid crystal panel and the backboard, and the buffer structure may be composed of the deformable sealed capsule and the filler flowable within the sealed capsule. When the display device suffers uneven internal forces resulting from deformation of the liquid crystal panel or the backboard, the flowable filler in the hollow part of the buffer structure flows to a position suffering a smaller force from a position suffering a larger force until achieving the force balance, thereby to reduce difference of the forces applied at different positions in the display device and further improve light leakage phenomenon caused by uneven forces.

The above embodiments are merely used for illustrating the present disclosure, but not intended to limit the present disclosure. Those ordinary skilled in the related art may make various changes and modifications without departing from the principle and scope of the present disclosure, thus all equivalent technical solutions shall also fall within the scope of the present disclosure. The protective scope of the present disclosure should be defined by the following claims.

What is claimed is:

1. A display device comprising:
a liquid crystal panel;
a backboard;
a rubber frame arranged at the backboard; and
a buffer structure arranged between the rubber frame and the liquid crystal panel;
wherein the buffer structure comprises a deformable capsule and a fluid sealed within the deformable capsule; and
wherein the fluid includes gas and liquid; the deformable capsule is a hollow semi-cylindrical structure with a cross-section of a semicircle shape; the deformable capsule comprises an internal wall and an external wall; the deformable capsule has a consistent thickness between the internal wall and the external wall at different positions; the rubber frame and the liquid crystal panel are at two opposite sides in a radial direction of the deformable capsule; the deformable capsule is in contact with both of the rubber frame and the liquid crystal panel along a longitudinal direction of the deformable capsule; and the fluid is flowable in the deformable capsule along the longitudinal direction of the deformable capsule.

2. The display device according to claim 1, wherein the buffer structure is connected to the rubber frame by a double-sided adhesive tape; and the buffer structure is connected to the liquid crystal panel by a double-sided adhesive tape.

3. The display device according to claim 2, wherein an area of the double-sided adhesive tape between the buffer structure and the rubber frame is different from an area of the double-sided adhesive tape between the buffer structure and the liquid crystal panel.

4. The display device according to claim 2, wherein an area of the double-sided adhesive tape between the buffer structure and the rubber frame is larger than an area of the double-sided adhesive tape between the buffer structure and the liquid crystal panel.

5. The display device according to claim 2, wherein a contact portion of the double-sided adhesive tape between the buffer structure and the rubber frame is of a different shape from a contact portion the double-sided adhesive tape between the buffer structure and the liquid crystal panel.

6. The display device according to claim 5, wherein there is a surface contact between the buffer structure and the double-sided adhesive tape that is between the buffer structure and the rubber frame; and there is a line contact between the buffer structure and the double-sided adhesive tape between the buffer structure and the liquid crystal panel.

7. The display device according to claim 1, wherein the fluid comprises an inert gas.

8. The display device according to claim 1, wherein the deformable capsule is made of an elastic material.

9. The display device according to claim 1, wherein the deformable capsule is made of silica gel.

* * * * *